R. M. FRANKLIN.
BICYCLE.
APPLICATION FILED APR. 6, 1907.
958,618.
Patented May 17, 1910.
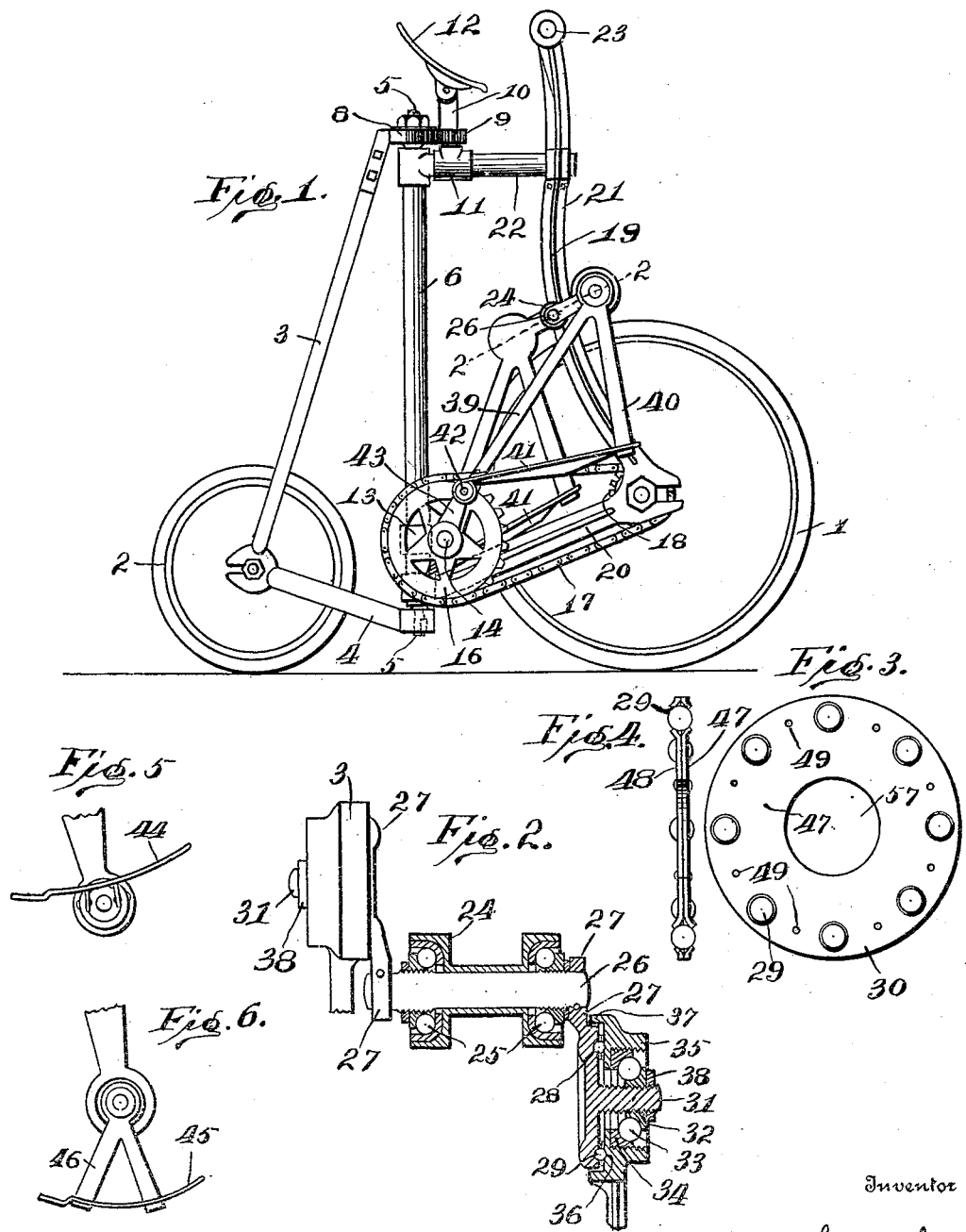

UNITED STATES PATENT OFFICE.

ROBERT M. FRANKLIN, OF GALVESTON, TEXAS.

BICYCLE.

958,618.   Specification of Letters Patent.   Patented May 17, 1910.

Application filed April 6, 1907. Serial No. 366,814.

*To all whom it may concern:*

Be it known that I, ROBERT M. FRANKLIN, a citizen of the United States, residing at Galveston, in the county of Galveston and State of Texas, have invented certain new and useful Improvements in Bicycles; and I do hereby declare the following to be a full, clear, and exact description of the invention, such as will enable others skilled in the art to which it appertains to make and use the same.

This invention relates to improvements in bicycles, and particularly to bicycles which are propelled by the front wheel.

The invention comprises the production of a frame, wheels therefor, a sprocket and chain for revolving the front wheel, pedals for revolving one of said sprockets, and balancing cranks for regulating the movement of the pedals.

The invention further comprises the production of a crank and crank hanger positioned on the front parts, bracing rods pivotally mounted thereon and secured to the pedals of the bicycle for regulating the angle at which the same is adapted to operate.

The invention still further comprises the production of ball bearing retaining means which is designed to hold the balls in proper position.

The object in view is the production of a bicycle propelled by the front wheel and improved means for regulating the angle at which the operating pedals are adapted to be positioned.

Another object in view is the production of a bicycle propelled by the front wheel, pedals for operating the driving mechanism thereof, and a crank and hanger secured to the front forks of the bicycle for holding the pedals at a predetermined angle, and securing the best application of the power of the muscles, especially when wheel is fitted with coaster brake.

With these and other objects in view the invention comprises certain novel constructions, combinations, and arrangements as will be hereinafter more fully described and claimed.

In the accompanying drawings:—Figure 1 is a side elevation of a bicycle constructed according to the present invention. Fig. 2 is a section of an auxiliary crank hanger on line 2—2, certain parts being shown in full, to better disclose the arrangement thereof. Fig. 3 is a side elevation of an improved ball retainer forming a part of the present invention. Fig. 4 is a vertical section through Fig. 3. Fig. 5, is a side elevation of a modified form of pedal. Fig. 6 is a still further modified form of pedal.

In constructing a bicycle according to the present invention, I provide a pair of wheels 1 and 2 of any desired construction, but I preferably provide the front wheel with a coaster brake and make the rear wheel 2 of considerably less size that the front wheel 1. Rear wheel 2 is mounted in rear stays 3 and rear forks 4 of any desired description. Rear forks 4 are rigidly secured by key 7 at their lower ends to bolt 5 which extends the full length of tube 6. The upper end of rear stays 3 are secured to a gear wheel 8 in any convenient manner, which in turn is keyed to or secured in any convenient manner to bolt 5. Gear wheel 8 is adapted to mesh with second gear 9 which is rigidly secured to seat post 10 which is pivotally mounted in bearing 11 of any desired construction. By this structure the person using the bicycle may guide the same by moving the seat 12 one way or the other which motion will be communicated to rear wheel 2 through the connections just described. Mounted upon the lower end of tube 6 in any convenient way is a crank hanger 13 of any desired construction. Within hanger 13 is journaled an axle 14 to which is rigidly secured a sprocket 16 which is designed to communicate power through chain 17 to a front sprocket 18 secured to wheel 1. Front wheel 1 is secured to front forks 19 in the usual way, and is designed to receive power for revolving the same through chain 17 from sprocket 16. The front fork 19 and the lower front forks or bracing members 20 are constructed preferably from flat metal formed with a rib 21 for stiffening the same. I preferably use this form of fork formed of flat metal with the rib 21, but it will be perfectly evident that round or flat tubing may be used as may be desired. Front forks 19 clasp at their upper end the upper tube or bracing member 22, and then pass upward to a suitable handle 23. From this it will be evident that handle 23 and front forks 19 are rigidly secured in position and are designed to turn with the front wheel and its frame and thus coöperate in the steering, which is to be done mainly through movement of saddle 12. The rigidity of handle 23 provides a bracing member against which the rider may brace himself when forcing seat 12 one way or the other. Mounted upon front forks 19 in any convenient way is a hanger 24 formed with suitable ball bearings 25. Passing through hanger 24 is a shaft 26 which has secured to each end thereof, cranks 27—27. Cranks 27—27 are provided with a groove 28 therein for accommodating ball bearings 29 which are held in position by a suitable ball retainer 30 more fully hereinafter described. Cranks 27—27 are also provided with a stub shaft 31 upon which is mounted cone 32 for forming a bearing surface for balls 33. A cup 34 is provided also for accommodating balls 33 and is held in position by a housing 35. Housing 35 has on inner side a flat, hardened face or shallow flat bottomed groove of sufficient width to allow slight eccentric play of the balls 29 so as to avoid binding when the bearings 29 and 33 are not exactly concentric. An annular flange 37 is also formed in housing 35 for slightly telescoping over the enlarged portion of cranks 27. Any desired locking means as nut 38 is provided for preventing cone 32 from backing off. By this construction, housing 35 is held in position against crank 27 and is provided with suitable antifriction means for making the same run more easily both in its vertical and lateral movement, as ball 33 will assist in preventing any large amount of friction when a vertical strain is brought on crank 27 and balls 29 will prevent friction when a lateral or thrust strain is brought against crank 27. Rigidly secured to housing 35 is a pair of depending rods 39 and 40 which are rigidly secured to pedal 41. Pedals 41 are pivotally mounted at 42 in any convenient manner to cranks 43 which are in turn rigidly secured to shaft 14. By this construction any power brought to bear on pedals 41 will be communicated directly to bearing 42 and from thence to wheel 1, or if the pressure is near the outer end of pedal 41 the power will be transmitted to housing 35, crank 26 to the outer pedal, and from thence to wheel 1. By this construction all the power exerted upon either of the pedals will be used either directly by the pedal upon which the power is exerted or through axle 26 and connecting mechanism to the other of said pedals. The use of shaft 26 and surrounding mechanism and depending or connecting bars 39 and 40, together with pedals 41 not only utilizes all the power exerted by the rider, but is designed to utilize the same to the best advantage as the pedals 41 are held at the proper angle at all times for receiving and transmitting the power exerted thereon to the driving wheel 1. The pedals 41 are designed preferably to be of considerable length, for instance, the length of the entire foot so as to have a broad bearing for the feet of the rider.

As a slight modification of form, in applying my improved pedal bearings in any machine where pedals are used, I may use the form shown in Fig. 5 in which a supporting member 44 is rigidly secured to a housing of the construction shown in Fig. 2, or I may use, in connection with the housing and bearings shown in Fig. 2, the modified form of supporting member or swinging pedal 45 rigidly attached to the short legs 46 as shown in Fig. 6. The main feature of this modification is the provision of a depending swinging foot-rest or pedal upon which the foot is designed to press when propelling the bicycle.

In Figs. 3 and 4 will be seen an improved ball retainer which is designed to be used in connection with the present invention. In this ball retainer, a pair of plates 47 and 48 are secured together in any convenient manner as by rivets 49. The plates 47 and 48 are provided with any desired number of apertures which are flared as at 50 and between which flaring edges balls 29 are forced. The flaring edges 50 will spring sufficiently to permit ball to be forced therebetween, and will then hold the same against accidental removal, or the balls may be first placed in the flared apertures and the plates next riveted together so as to confine the balls loosely. By this structure of apertures formed with flaring edges, balls 29 are firmly held in position but yet are adapted to project far enough beyond the edges to form a bearing surface. A suitable aperture 51 is provided centrally of plates 47 and 48 for accommodating a shaft or axle of any kind that may be desired to pass therethrough.

What I claim is:—

1. A device of the character described, comprising a frame, wheels mounted in said frame, a steering apparatus on said frame, a sprocket secured to the front wheel, pedals for moving said sprocket, means for conveying power to said pedals, and a plurality of means for operating said power conveying means for determining the angle at which said pedals operate.

2. A device of the character described, comprising a frame, wheels mounted therein, a sprocket secured to the front wheel, a sprocket secured centrally of said frame, means for communicating power from said centrally positioned sprocket to said sprocket on the front wheel, pedals for revolving said centrally positioned sprocket, a crank hanger mounted on said frame above the front wheel, an axle and cranks journaled in said crank hanger, and means connecting said pedals, regulating the angle, and transmitting power from one to the other of said pedals.

3. A device of the character described, comprising a frame, wheels mounted in said frame, means for guiding the device, and means for propelling the device by the front wheel, said means comprising a centrally positioned sprocket on said frame, a sprocket on said front wheel, means for transmitting power between said sprockets, cranks for rotating said sprocket mounted in said frame, pedals secured to the outer extremities of said cranks, auxiliary cranks mounted on the front of said frame and connecting rods between said pedals and said auxiliary cranks.

4. In a device of the character described, a frame, wheels in said frame, securing means, and propelling means, said propelling means comprising a sprocket carried by the front wheel, a crank shaft mounted centrally of the frame, cranks secured to said crank shaft, a sprocket secured to said crank shaft, means connecting said sprockets for communicating power from one sprocket to the other, a crank shaft carried by the front forks of said frame, cranks secured to said last mentioned crank shafts, depending arms rotatably mounted on the extremities of said last mentioned cranks, and pedals supported at one end by said arms and at the other pivotally connected to the extremities of the cranks carried by the centrally mounted crank shaft.

In testimony whereof I affix my signature in presence of two witnesses.

ROBERT M. FRANKLIN.

Witnesses:
J. SINGER,
C. H. ANDERSON.